United States Patent [19]

Kadaira

[11] Patent Number: 5,293,604
[45] Date of Patent: Mar. 8, 1994

[54] MEMORY ACCESS CONTROL DEVICE HAVING BANK ACCESS CHECKING CIRCUITS SMALLER IN NUMBER THAN MEMORY MODULES

[75] Inventor: Gizo Kadaira, Tokyo, Japan
[73] Assignee: NEC Corporation, Tokyo, Japan
[21] Appl. No.: 655,947
[22] Filed: Feb. 15, 1991
[30] Foreign Application Priority Data
  Feb. 15, 1990 [JP] Japan .................. 2-35704
[51] Int. Cl.$^5$ ............................................. G06F 12/00
[52] U.S. Cl. .............................. 395/425; 364/DIG. 1;
        364/243; 364/243.6; 364/246; 364/254
[58] Field of Search ...................... 395/400, 425
[56] References Cited
  U.S. PATENT DOCUMENTS
  3,601,812  8/1971  Weisbecker ................... 395/425
  3,806,881  4/1974  Miwa et al. .................. 395/400
  5,167,028 11/1992  Shires ......................... 395/425

Primary Examiner—Rebecca L. Rudolph
Attorney, Agent, or Firm—Foley & Lardner

[57] ABSTRACT

In a memory access control device (10) for use in controlling access by at least one address signal to a memory device (11) comprising memory modules each of which comprises a plurality of memory banks, a module checking circuit (16) checks first and second module signals indicative of the memory modules to produce a module coincidence signal when the first and the second module signals coincide with each other. First and second bank access checking circuits (17, 18) are assigned with first and second preselected number of memory modules and check first and second bank address signals indicative of the memory banks and first and second bank access held signals indicative of at least two of the memory banks which should be accessed. The first and the second bank access checking circuits produce first and second bank coincidence signals when the first and the second bank address signals coincide with the first and the second bank access held signals. An access judging circuit (191) alternatingly produces first and second inhibit signals in response to the module coincidence signal. The first and the second inhibit signals are also produced in response to the first and the second bank coincidence signals. An access signal output control circuit (20) inhibits supply of the address signal as first and second address signals to the memory device in response to the first and the second inhibit signals.

3 Claims, 8 Drawing Sheets

FIG. 7

| PORT 161 | PORT 1710 | PORT 1720 | PORT 1810 | PORT 1820 | PORT 1922 | PORT 1923 | PORT 1924 | PORT 1931 | PORT 1932 |
|---|---|---|---|---|---|---|---|---|---|
|  | 0 | 0 | 0 | 0 | x | 0 | 0 | 1 | 1 |
|  | 0 | 0 | 0 | 1 | x | 0 | 1 | 1 | 0 |
|  | 0 | 0 | 1 | 0 | x | 1 | 0 | 0 | 1 |
|  | 0 | 0 | (1) | (1) | x | 1 | 1 | 0 | 0 |
|  | 0 | 1 | 0 | 0 | x | 0 | 1 | 1 | 0 |
| o | 0 | (1) | 0 | (1) | x | 1 | 1 | 0 | 0 |
|  | 0 | 1 | 1 | 0 | x | 1 | 1 | 0 | 0 |
|  | 0 | 0 | (1) | (1) | x | 1 | 1 | 0 | 0 |
|  | 1 | 0 | 0 | 0 | x | 1 | 0 | 0 | 0 |
|  | 1 | 0 | 0 | 1 | x | 1 | 1 | 0 | 1 |
|  | (1) | 0 | (1) | 0 | x | 1 | 1 | 0 | 0 |
|  | 1 | (1) | (1) | (1) | x | 1 | 1 | 0 | 0 |
|  | (1) | (1) | 0 | 0 | x | 1 | 1 | 0 | 0 |
|  | (1) | (1) | 0 | 1 | x | 1 | 1 | 0 | 0 |
|  | (1) | (1) | 1 | 0 | x | 1 | 1 | 0 | 0 |
|  | (1) | (1) | (1) | (1) | x | 1 | 1 | 0 | 0 |

FIG. 8

| PORT 161 | PORT 1710 | PORT 1720 | PORT 1810 | PORT 1820 | PORT 1922 | PORT 1923 | PORT 1924 | PORT 1931 | PORT 1932 |
|---|---|---|---|---|---|---|---|---|---|
| 1 | 0 | 0 | 0 | 0 | 0 | 1 | 0 | 0 | 1 |
|   | 0 | 0 | 0 | 0 | 1 | 0 | 1 | 1 | 0 |
|   | 0 | 0 | 0 | 1 | x | 0 | 1 | 1 | 0 |
|   | 0 | 0 | 1 | 0 | x | 1 | 0 | 0 | 1 |
|   | 0 | 0 | (1) | (1) | x | 1 | 1 | 0 | 0 |
|   | 0 | 1 | 0 | 0 | x | 0 | 1 | 1 | 0 |
|   | 0 | (1) | 0 | (1) | x | 1 | 1 | 0 | 0 |
|   | 0 | 1 | 1 | 0 | x | 1 | 1 | 0 | 0 |
|   | 1 | 0 | (1) | (1) | x | 1 | 1 | 0 | 0 |
|   | 1 | 0 | 0 | 0 | x | 1 | 0 | 0 | 1 |
|   | (1) | 0 | (1) | 1 | x | 1 | 1 | 0 | 0 |
|   | 1 | (1) | (1) | 0 | x | 1 | 1 | 0 | 0 |
|   | (1) | (1) | 0 | (1) | x | 1 | 1 | 0 | 0 |
|   | (1) | (1) | 0 | 0 | x | 1 | 1 | 0 | 0 |
|   | (1) | (1) | 1 | 1 | x | 1 | 1 | 0 | 0 |
|   | (1) | (1) | 0 | 0 | x | 1 | 1 | 0 | 0 |
|   | (1) | (1) | (1) | (1) | x | 1 | 1 | 0 | 0 |

MEMORY ACCESS CONTROL DEVICE HAVING BANK ACCESS CHECKING CIRCUITS SMALLER IN NUMBER THAN MEMORY MODULES

BACKGROUND OF THE INVENTION

The present invention relates to a memory access control device which is for controlling access to a memory device. The memory device comprises a plurality of memory modules, each of which comprises a predetermined number of memory banks.

A memory access control device of the type described, generally comprises an address signal processing circuit, a first bank address signal holding circuit, a second bank address signal holding circuit, a first bank access signal holding circuit, a second bank access signal holding circuit, a first bank access checking circuit, a second bank access checking circuit, an access judging circuit, a shift signal supply circuit, and an access signal output control circuit.

The address signal processing circuit is supplied with a first input address signal comprising a first module address portion, a first bank address portion, and a first element address portion and a second input address signal comprising a second module address portion, a second bank address portion, and a second element address portion and processes the first and the second bank address portions into first and second bank address signals and produces the first and the second input address signals as first and second address signals as they are.

The address signal processing circuit is supplied with the first and the second input address signals from first and second processors.

The first and the second input address signals are identical with the first and the second address signals. The first bank address signal holding circuit is connected to the address signal processing circuit and holds the first bank address signal as a first bank address held signal. The second bank address signal holding circuit is connected to the address signal processing circuit and holds the second bank address signal as a second bank address held signal.

The first bank access signal holding circuit is connected to the first bank address signal holding circuit, corresponds to one of the memory modules, and holds a first bank access held signal. The second bank access signal holding circuit is connected to the second bank address signal holding circuit, corresponds to the above-mentioned memory module, and holds a second bank access held signal.

The first bank access checking circuit is connected to the address signal processing circuit and the first bank access signal holding circuit, corresponds to a different memory module, and checks the first bank address signal and the first bank access held signal to produce a first bank coincidence signal when the first bank address signal and the first bank access held signal coincide with each other. The second bank access checking circuit is connected to the address signal processing circuit and the second bank access signal holding circuit, corresponds to the different one of the memory modules, and checks the second bank address signal and the second bank access held signal to produce a second bank coincidence signal when the second bank address signal and the second bank address held signal coincide with each other.

The access judging circuit is connected to the module checking circuit and the first and the second bank access checking circuits and alternately produces a first inhibit signal and a second inhibit signal when supplied with the module coincidence signal. The access judging circuit produces the first inhibit signal when supplied with the first bank coincidence signal. The access judging circuit produces the second inhibit signal when supplied with the second bank coincidence signal. The access judging circuit produces first and second shift signals when the first and second inhibit signals are not produced, respectively.

The shift signal supply circuit is connected to the access judging circuit and the first and the second bank address signal holding circuits and uses the first and the second shift signals in transferring the first bank address held signal to the first bank access signal holding circuit as the first bank access held signal and in transferring the second bank address held signal to the second bank access signal holding circuit as the second bank access held signal.

The access signal output control circuit is connected to the above-mentioned plurality of memory modules, the address signal processing circuit, and the access judging circuit. The access signal output control circuit specifies by the first address signal, as a first specified memory module and a first specified memory bank, a particular memory module of the and a particular memory bank of the predetermined number of memory banks in the particular memory module. The access signal output control circuit sends the first element address portion to the first specified memory bank of the first specified memory module when the access signal output control circuit is supplied with the first address signal and when the access judging circuit does not produce the first inhibit signal. The access signal output control circuit specifies by the second address signal, as a second specified memory bank module and a second specified memory bank, a specific memory module of the number of memory modules and a specific memory bank of the predetermined number of memory banks in the specific memory module. The access signal output control circuit sends the second element address portion to the second memory bank of the second specified memory module when the access signal output control circuit is supplied with the second address signal and when the access judging circuit does not produce the second inhibit signal. The memory access control device can prevent the first and the second processors from accessing the same memory module at the same.

In the memory access control device thus far described, the first bank access checking circuit corresponds to only one of the memory modules and the second bank access checking circuit corresponds to the above-mentioned one of the memory modules. Thus, the memory access control device has the same number of memory modules and the same number of bank access checking circuits. Consequently, the memory access control device must comprise a large amount of hardware particularly when the memory modules are large in number.

SUMMARY OF THE INVENTION

It is therefore the object of the present invention to provide a memory access control device which is capable of decreasing an amount of hardware, i.e., it is to provide a memory access control device which has bank access checking circuits smaller in number than memory modules.

Other objectives of this invention will become clear as the description proceeds.

In describing this invention, it is necessary to understand that a memory access control device is for accessing first through N-th memory device comprising a memory modules, with each of the memory modules where N represents an integer greater than three comprising a predetermined number of memory banks.

According to this invention, the above-understood memory access control device comprises (a) address signal processing means supplied with a first input address signal comprising a first module address portion, a first bank address portion, and a first element address portion and a second input address signal comprising a second module address portion, a second bank address portion, and a second element address portion for processing the first and the second module address portions into first and second module address signals each of which represents one of the addresses in the memory modules, the first and the second bank address portions into first and second bank address signals each of which represents one of the addresses of the memory banks and for producing the first and the second input address signals as first and second address signals as they are, (b) a first bank address signal holding circuit connected to the address signal processing means for holding the first bank address signal as a first bank address held signal, (c) a second bank address signal holding circuit connected to the address signal processing means for holding the second bank address signal as a second bank address held signal, (d) a module checking circuit connected to the address signal processing means for checking the first and the second module address signals to produce a module coincidence signal when the first and the second module address signals coincide with each other, (e) a first bank access signal holding circuit connected to the first bank address signal holding circuit for holding a first bank access held signal, (f) a second bank access signal holding circuit connected to the second bank address signal holding circuit for holding a second bank access held signal, (g) a first bank access checking circuit connected to the address signal processing circuit and the first bank access signal holding circuit for checking the first bank address signal and the first bank access held signal to produce a first bank coincidence signal when the first bank address signal and the first bank access held signal coincide with each other, (h) a second bank access checking circuit connected to the address signal processing means the second bank access signal holding circuit and for checking the second bank address signal and the second bank access held signal to produce a second bank coincidence signal when the second bank address signal and the second bank address held signal coincide with each other, (i) access judging means connected to the module checking circuit and the first and the second bank access checking circuits to alternatingly produce a first inhibit signal and a second inhibit signal when supplied with the module coincidence signal, the access judging means producing the first inhibit signal when supplied with the first bank coincidence signal, the access judging means producing the second inhibit signal when supplied with the second bank coincidence signal, the access judging means producing first and second shift signals when the first and the second inhibit signals are not produced, respectively, (j) shift signal supply means connected to the access judging means and the first and the second bank address signal holding circuits for using the first and the second shift signals in transferring the first bank address held signal to the first bank access signal holding circuit as the first bank access held signal, and the second bank address held signal to the second bank access signal holding circuit as the second bank access held signal, and (k) access signal output control means connected to the memory modules, the address signal processing circuit, and the access judging means for specifying by the first address signal, as a first specified memory module and a first specified memory bank, a particular memory module of the memory modules and a particular memory bank of the predetermined number of memory banks in the particular memory module to send the first element address portion to the first specified memory bank of the first specified memory module when the access signal output control means is supplied with the first address signal and when the access judging means does not produce the first inhibit signal, the access signal output control means specifying, as a second specified memory bank module and a second specified memory bank, a specific memory module of the memory modules and a specific memory bank of the predetermined number of memory banks in the specific memory module to send the second element address portion to the second specified memory bank of the second memory module when the access signal output control means is supplied with the second address signal and when the access judging means does not produce the second inhibit signal.

BRIEF DESCRIPTION OF THE DRAWING

FIGS. 7 and 8 show in cooperation a truth table for use in describing operation of the access judging circuit illustrated in FIG. 6.

DESCRIPTION OF THE PREFERRED EMBODIMENT

Figure 1:
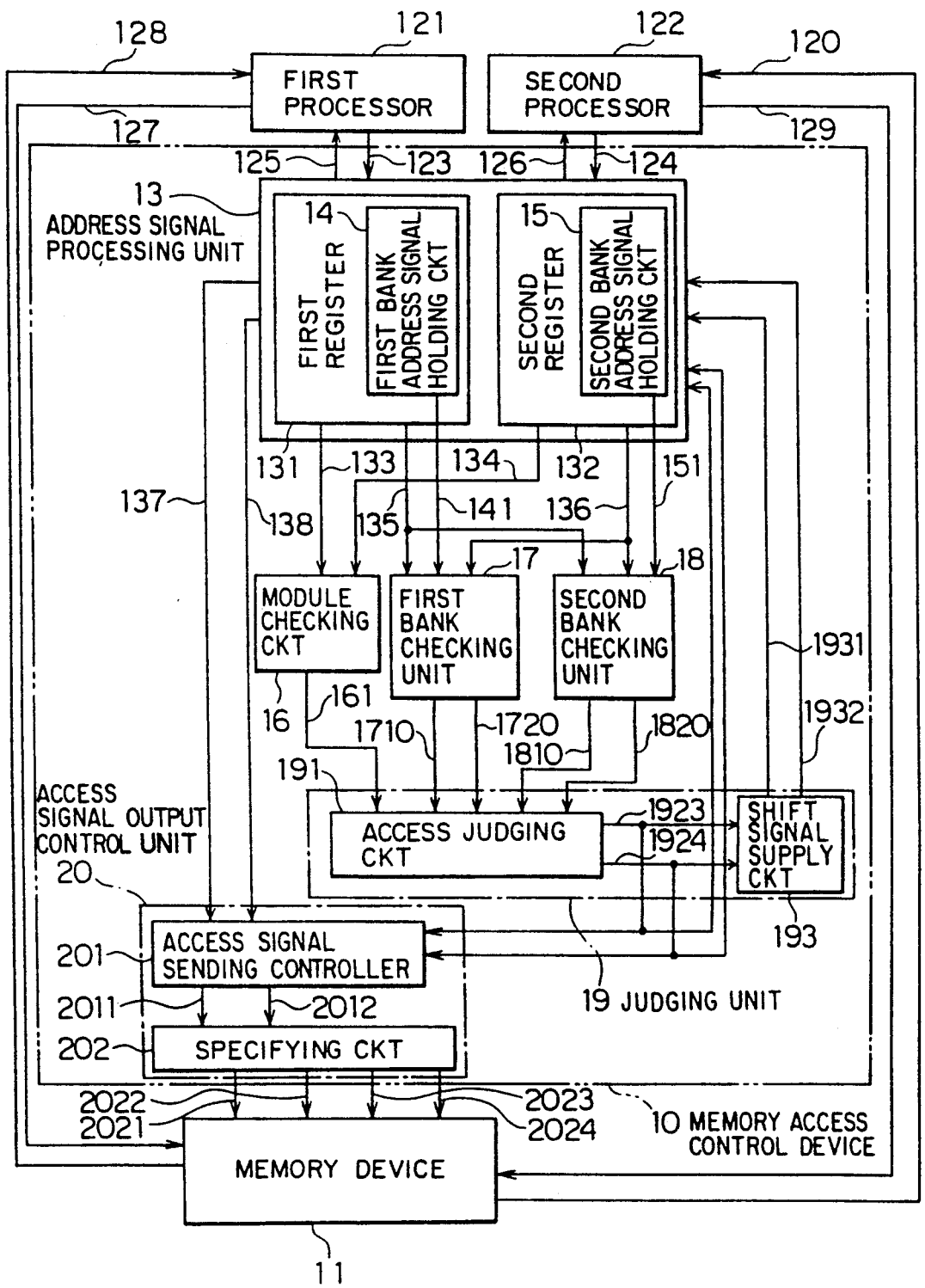
FIG. 1 is a block diagram of a memory access control device according to an embodiment of this invention for use in combination with a memory device.

Referring to FIG. 1, a memory access control device 10 according to a preferred embodiment of this invention is for controlling access to a memory device 11. The memory access control device 10 is connected to first and second processors 121 and 122 through two ports 123 and 124. The memory access control device 10 operates in accordance with the pulses of a clock signal.

Figure 2:
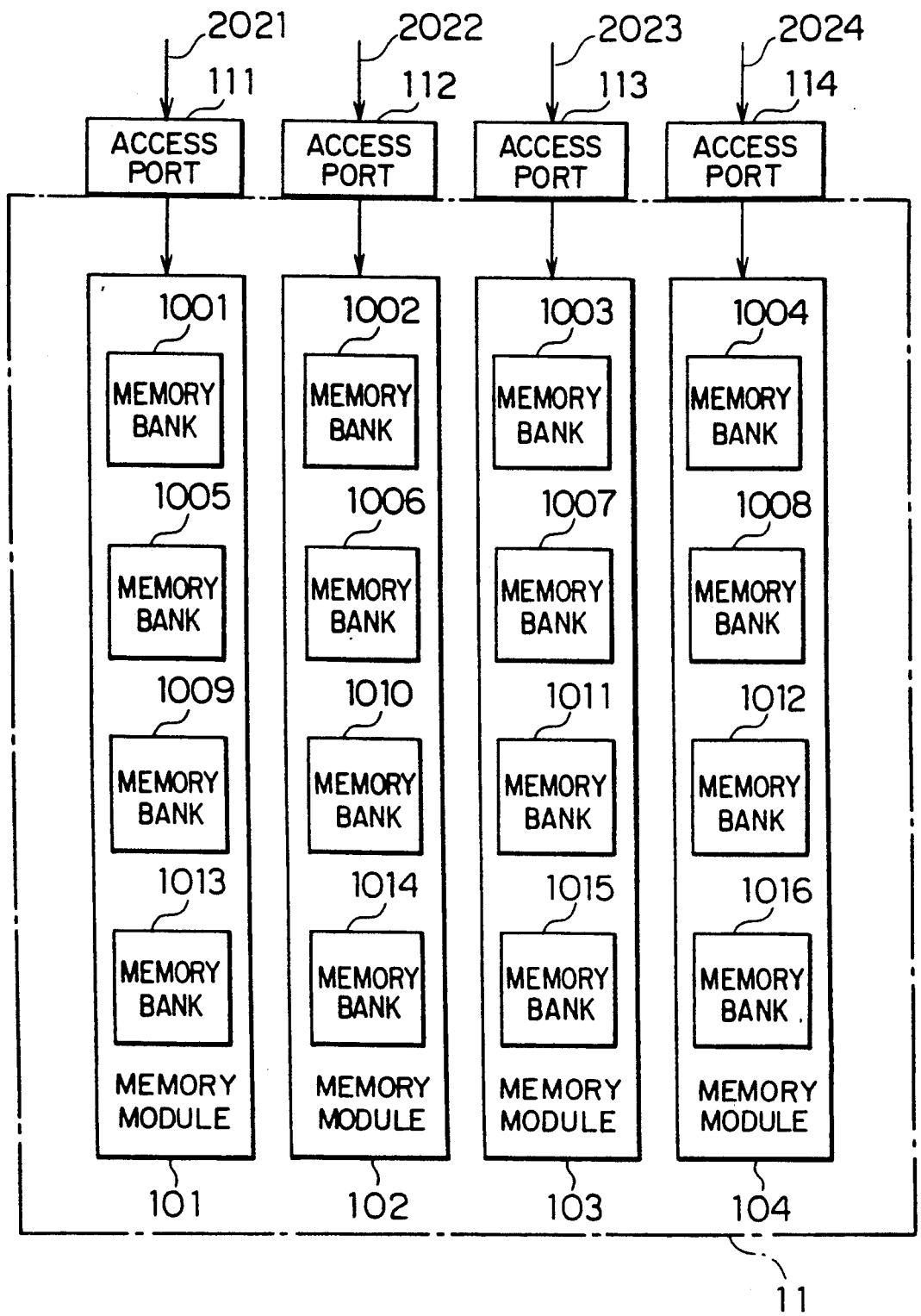
FIG. 2 is a block diagram of the memory device illustrated in FIG. 1.

Turning to FIG. 2, the memory device 11 comprises a plurality of memory modules 101 to 104. The memory modules 101 to 104 have access ports 111 to 114, respectively, so as to be accessed separately. Each of the memory modules 101 to 104 comprises a first predetermined number of memory banks 1001, 1005, 1009, and 1013; 1002; 1006; 1010; and 1014; 1003, 1007, 1011, and 1015; or 1004, 1008, 1012, and 1016. The memory banks 1001 to 1016 have access ports (not shown), respectively, so as to be accessed. Each of the memory banks 1001 to 1016 comprises a second predetermined number of memory elements (not shown).

Turning back to FIG. 1, the memory access control device 10 comprises an address signal processing unit 13. The address signal processing unit 13 is connected through the two ports 123 and 124 to the first and the second processors 121 and 123 and is respectively supplied with first and second input address signals from the first and the second processors 121 and 122.

Figure 3:
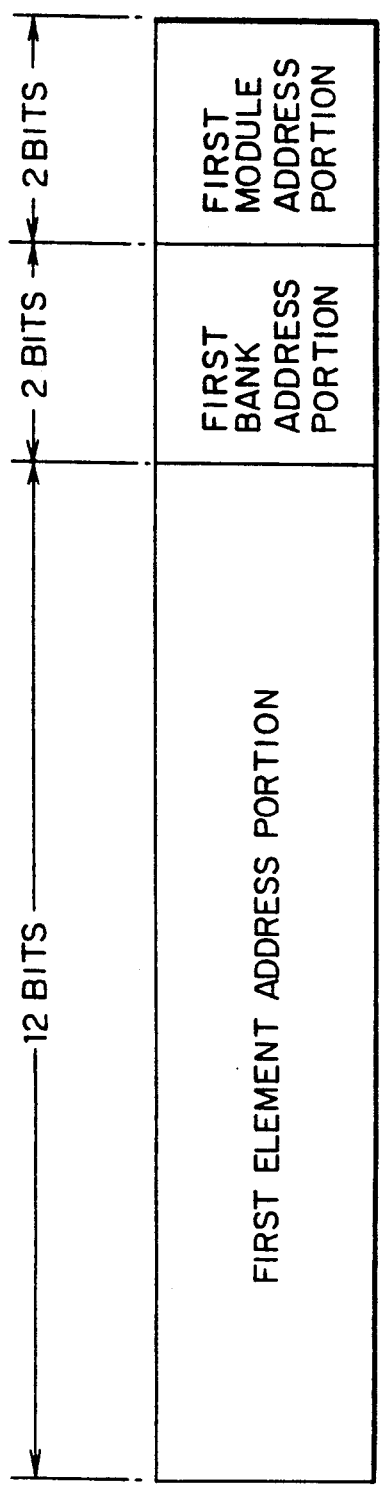
FIG. 3 is a schematic diagram of an input address signal.

Turning to FIG. 3, the first input address signal comprises a first module address portion, a first bank address portion, and a first input element address portion. The first module address portion has two bits. The first bank address portion has two bits. The first element address portion has twelve bits.

The second input address signal comprises a second module address portion, a second bank address portion, and a second element address portion. The second module address portion has two bits. The second bank address portion has two bits. The second element address portion has twelve bits.

Turning back to FIG. 1, the address signal processing unit 13 comprises first and second registers 131 and 132 and a plurality of gate circuits (not shown). The first register 131 is supplied with the first input address signal from the first processor 121 through the port 123. The second register 132 is supplied with the second input address signal from the second processor 122 through the port 124. The address signal processing unit 13 processes the first and the second module address portions into first and second module address signals, each of which represents one of the addresses of the memory modules 101 to 104, the first and the second bank address portions into first and the second bank address signals each of which represents one of the addresses of the memory banks 1001 to 1016, and produces the first and the second input address signals into first and second address signals as they are. The first and the second input address signals are equal to, or identical with, the first and the second address signals.

A first bank address signal holding circuit 14 comprises a plurality of gate circuits (not shown) and is a part of the first register 131. This part of the first register 131 holds the first bank address portion of the first bank address signal. The first bank address signal holding circuit 14 holds the first bank address portion of the first bank address signal as a first bank address held signal. A second bank address signal holding circuit 15 comprises a plurality of gate circuits (not shown) and is a part of the second register 132. This part of the second register 132 holds the second bank address portion of the second bank address signal. The second bank address signal holding circuit 15 holds the second bank address portion of the second bank address signal as a second bank address held signal.

A module checking circuit 16 is connected to the first and the second registers 131 and 132 through two ports 133 and 134. The module checking circuit 16 is supplied with the first and the second module signals from the first and the second registers 131 and 132 and checks the first and the second module address signals to produce a module coincidence signal when the first and the second module address signals coincide with each other.

A first bank checking unit 17 is connected to the first and the second registers 131 and 132 through two ports 135 and 136 and connected to the first bank address signal holding circuit 14 through a port 141. A second checking unit 18 is connected to the first and the second registers 131 and 132 through the ports 135 and 136 and connected to the second bank address signal holding circuit 15 through a port 151.

Figure 4:
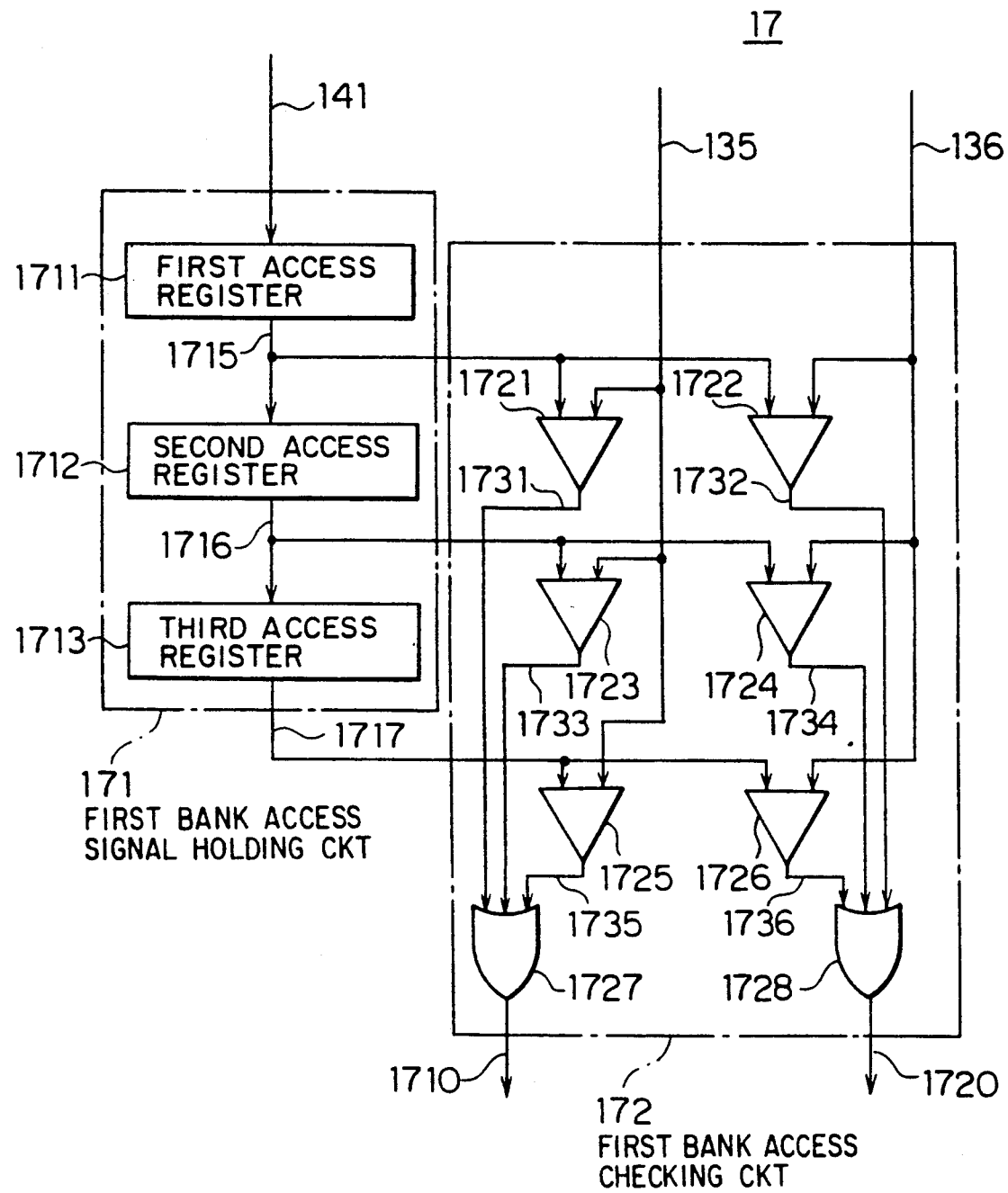
FIG. 4 is a block diagram of a first bank check circuit for use in the memory access control device illustrated in FIG. 1.

Turning to FIG. 4, the first bank checking unit 17 comprises a first bank access signal holding circuit 171 and a first bank access checking circuit 172.

The first bank access signal holding circuit 171 is connected to the first bank address signal holding circuit 14 (FIG. 1) and comprises the first through third access registers 1711 to 1713. Supplied with the first bank address held signal through the port 141, the first access register 1711 memorizes the first bank address held signal as a first memorized signal when the first access register 1711 receives first shift signal. The first shift signal is substantially equal to one of the clock pulses. Supplied with the first memorized signal, the second access register 1712 memorizes the first memorized signal as a second memorized signal on reception of the first shift signal. Likewise, the third access register 1713 memorizes the second memorized signal as a third memorized signal on reception of the first shaft signal. Thus, the first bank access signal holding circuit 171 holds a first bank access held signal which is a combination of the first through the third memorized signals.

The first bank access checking circuit 172 is connected to the first and the second registers 131 and 132 through the ports 135 and 136, and the first through the third access registers 1711 to 1713 through three ports 1715 to 1717. The first bank access checking circuit 172 comprises first through sixth comparators 1721 to 1726 and two OR gates 1727 and 1728.

The first comparator 1721 is connected to the first register 131 (FIG. 1) and the first access register 1711 through the port 135 and the port 1715. The first comparator 1721 is supplied with the first bank address signal and the first memorized signal through the ports 135 and 1715, compares the first bank address signal and the first memorized signal, and produces a first access coincidence signal when the first bank address signal and first memorized signal coincide with each other.

The second comparator 1722 is connected to the second register 132 (FIG. 1) and the first access register 1711 through the ports 136 and 1715. The first comparator 1722 is supplied with the first bank address signal and the first memorized signal through the ports 136 and 1715, compares the second bank address signal and the first memorized signal, and produces second access coincidence signal when the second bank address signal and the first memorized signal coincide with each other.

The third comparator 1723 is connected to the first register 131 (FIG. 1) and the second access register 1712 through the ports 135 and 1716. The third comparator 1723 is supplied with the first bank address signal and the second memorized signal through the ports 135 and 1716, compares the first bank address signal and the second memorized signal, and produces a third access coincidence signal when the first bank address signal and second memorized signal coincide with each other.

The fourth comparator 1724 is connected to the second register 132 (FIG. 1) and the second access register 1712 through the ports 136 and 1716. The fourth comparator 1724 is supplied with the second bank address signal and the second memorized signal through the ports 136 and 1716, compares the second bank address signal and the second memorized signal, and produces a fourth access coincidence signal when the second bank address signal and second memorized signal coincide with each other.

The fifth comparator 1725 is connected to the first register 131 (FIG. 1) and the third access register 1713 through the ports 135 and 1717. The fifth comparator 1725 is supplied with the first bank address signal and the third memorized signal through the ports 135 and 1717, compares the first bank address signal and the third memorized signal, and produces a fifth access coincidence signal when the first bank address signal and the third memorized signal coincide with each other.

The sixth comparator 1726 is connected to the second register 132 (FIG. 1) and the third access register 1713 through the ports 136 and 1717. The sixth comparator 1726 is supplied with the second bank address signal and the third memorized signal through the ports 136 and 1717, compares the second bank address signal and the third memorized signal, and produces a sixth access coincidence signal when the second bank address signal and third memorized signal coincide with each other.

The OR gate 1727 is connected to the first, the third, and the fifth comparators 1721, 1723, and 1725 through three ports 1731, 1733, and 1735. The OR gate 1727 is supplied with the first, the third, and the fifth access coincidence signal through the ports 1731, 1733, and 1735 and outputs its ORed signal as a first bank coincidence signal through a port 1710.

The OR gate 1728 is connected to the second, the fourth, and the sixth comparators 1722, 1724, and 1726 through three ports 1732, 1734, and 1736. The OR gate 1728 is supplied with the second, the fourth, and the sixth access coincidence signal through the ports 1732, 1734, and 1735 and outputs its ORed signal as a second bank coincidence signal through a port 1720.

Thus, the first bank access checking circuit 172 checks the first bank address signal and the first bank access held signal to produce the first bank coincidence signal when the first bank address signal and the first bank access held signal coincide with each other. The first bank access checking circuit 172 checks the second bank address signal and the first bank access held signal to produce the second bank coincidence signal when the second bank address signal and the first bank access held signal coincide with each other.

Figure 5:
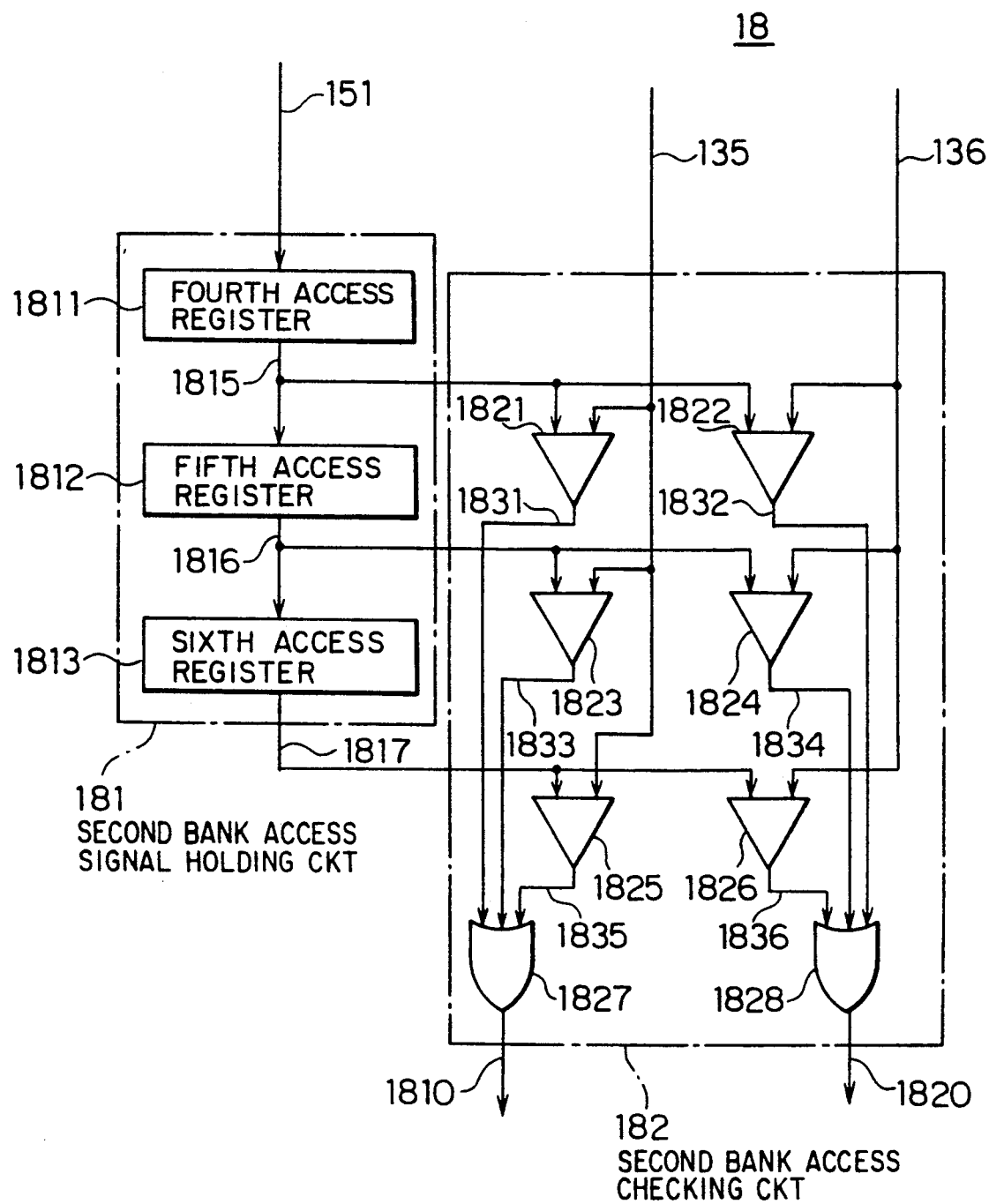
FIG. 5 is a block diagram of a second bank check circuit for use in the memory access control device illustrated in FIG. 1.

Turning to FIG. 5, the second bank checking unit 18 comprises a second bank access signal holding circuit 181 and a second bank access checking circuit 182.

The second bank access signal holding circuit 181 is connected to the second bank address signal holding circuit 15 (FIG. 1) and comprises fourth through sixth access registers 1811 to 1813. Supplied with the second bank address held signal through the port 151, the fourth access register 1811 memorizes the second bank address held signal as a fourth memorized signal when the fourth access register 1811 receives second shift signal. Supplied with the fourth memorized signal, the fifth access register 1812 memorized the fourth memorized signal as a fifth memorized signal on reception of the second shift signal. Likewise, the sixth access register 1813 memorizes the fifth memorized signal as a sixth memorized signal on reception of the second shift signal. Thus, the second bank access signal holding circuit 181 holds a second bank access held signal which is a combination of the fourth through the sixth memorized signals.

The second bank access checking circuit 182 is connected to the first and the second registers 131 and 132 through the ports 135 and 136 and to the fourth through the sixth access registers 1811 to 1813 through three ports 1815 to 1817. The first bank access checking circuit 182 comprises seventh through twelfth comparators 1821 to 1826 two OR gates 1827 and 1828.

The seventh comparator 1821 is connected to the first register 131 (FIG. 1) and the fourth access register 1811 through the ports 135 and 1815. The fourth comparator 1821 is supplied with the first bank address signal and the fourth memorized signal through the ports 135 and 1815, compares the first bank address signal and the fourth memorized signal, and produces a seventh access coincidence signal when the first bank address signal and the fourth memorized signal coincide with each other.

The eighth comparator 1822 is connected to the second register 132 (FIG. 1) and the fourth access register 1811 through the ports 136 and 1815. The eighth comparator 1822 is supplied with the second bank address signal and the fourth memorized signal through the ports 136 and 1815, compares the second bank address signal and the fourth memorized signal, and produces an access coincidence signal when the second bank address signal and the fourth memorized signal coincide with each other.

The ninth comparator 1823 is connected to the first register 131 (FIG. 1) and the fifth access register 1812 through the ports 135 and 1816. The ninth comparator 1823 is supplied with the first bank address signal and the fifth memorized signal through the ports 135 and 1816, compares the first bank address signal and the fifth memorized signal, and produces a ninth access coincidence signal when the first bank address signal and the fifth memorized signal coincide with each other.

The tenth comparator 1824 is connected to the second register 132 (FIG. 1) and the fifth access register 1812 through the ports 136 and 1816. The tenth comparator 1824 is supplied with the second bank address signal and the fifth memorized signal through the ports 136 and 1816, compares the second bank address signal and the fifth memorized signal, and produces tenth access coincidence signal when the second bank address signal and the fifth memorized signal coincide with each other.

The eleventh comparator 1825 is connected to the first register 131 (FIG. 1) and the sixth access register 1813 through the ports 135 and 1717. The eleventh comparator 1825 is supplied with the first bank address signal and the sixth memorized signal through the ports 135 and 1817, compares the first bank address signal and the sixth memorized signal, and produces an eleventh access coincidence signal when the first bank address signal and the sixth memorized signal coincide with each other.

The twelfth comparator 1826 is connected to the second register 132 (FIG. 1) and the sixth access register 1813 through the ports 136 and 1817. The twelfth comparator 1826 is supplied with the second bank address signal and the sixth memorized signal through the ports 136 and 1817, compares the second bank address signal and the sixth memorized signal, and produces a twelfth access coincidence signal when the second bank address signal and the sixth memorized signal coincide with each other.

The OR gate 1827 is connected to the seventh, the ninth, and the eleventh comparators 1821, 1823, and 1825 through three ports 1831, 1833, and 1835. The OR gate 1827 is supplied with the seventh, the ninth, and the eleventh access coincidence signal through the ports 1831, 1833, and 1835 and output its ORed signal as the first bank coincidence signal through a port 1810.

The OR gate 1828 is connected to the eighth, the tenth, and the twelfth comparators 1822, 1824, and 1826 through three ports 1832, 1834, and 1836. The OR gate 1828 is supplied with the eighth, the tenth, and the twelfth access coincidence signal through the ports 1832, 1834, and 1835 and outputs its ORed signal as the second bank coincidence signal through a port 1820.

Thus, the second bank access checking circuit 182 checks the first bank address signal and the second bank access held signal to produce the first bank coincidence signal when the first bank address signal and the second bank access held signal coincide with each other. The second bank access checking circuit 182 checks the second bank address signal and the second bank access held signal to produce the second bank coincidence signal when the second bank address signal and the first bank access held signal coincide with each other.

Turning back to FIG. 1, a judging unit 19 is connected to the module checking circuit 16 and the first and the second bank checking units 17 and 18 through the ports 161, 1710, 1720, 1810, and 1820. The judging unit 19 comprises an access judging circuit 191 and a shift signal supply circuit 193.

Figure 6:
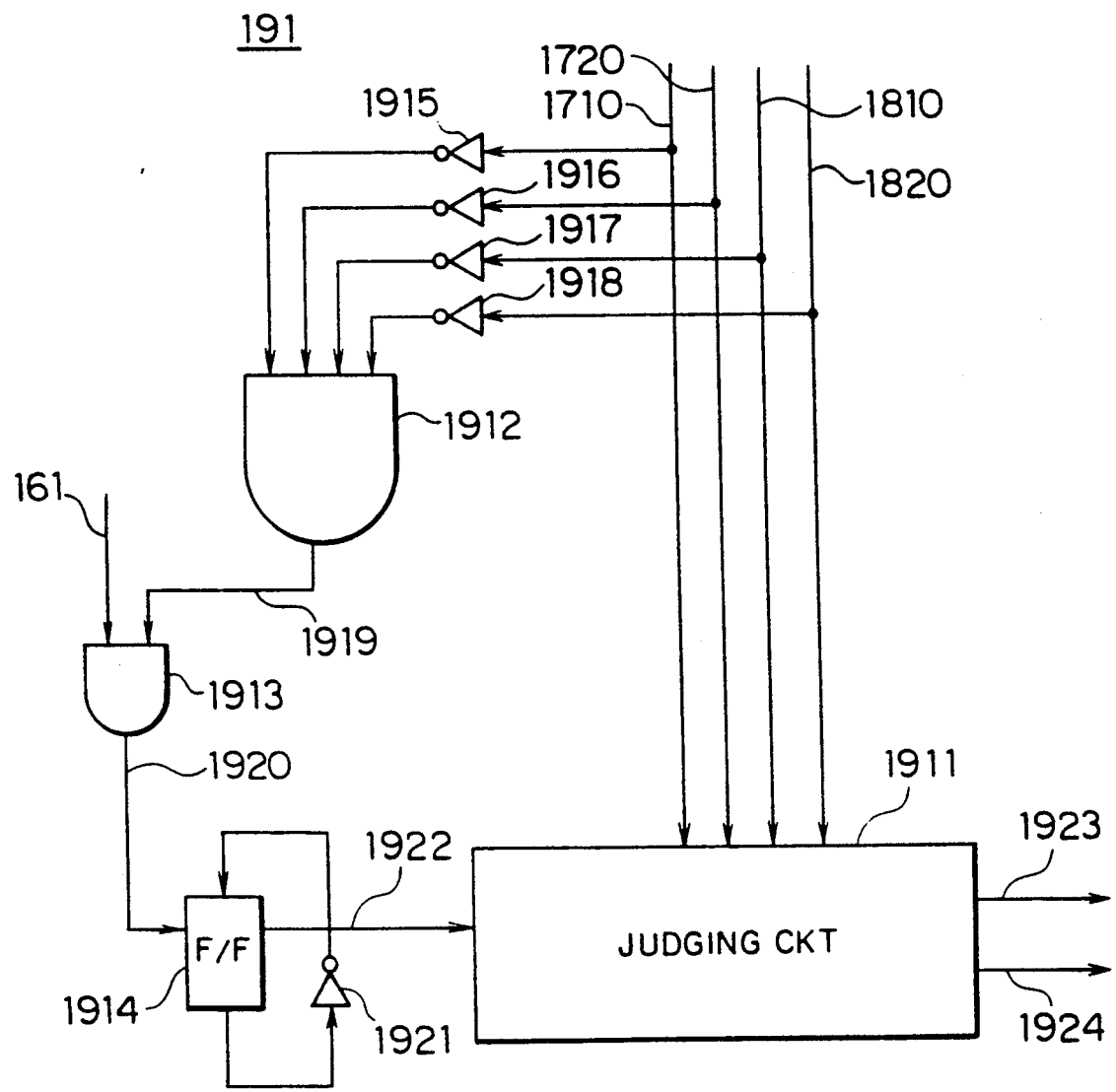
FIG. 6 is a block diagram of an access judging circuit for use in the memory access control device illustrated in FIG. 1.

Turning to FIG. 6, the access judging circuit 191 comprises a judging circuit 1911, a first AND gate 1912, a second AND gate 1913, and a module flag 1914. The first AND gate 1912 is connected to the ports 1710, 1720, 1810, and 1820 through inverters 1915 to 1918. The first AND gate 1912 is supplied with the first bank access coincidence signal from the first bank checking unit 17 (FIG. 1) through the port 1710 and the inverter 1915, with the second bank access coincidence signal from the first bank checking 17 (FIG. 1) through the port 1720 and the inverter 1916, with the first bank access coincidence signal from the second bank checking unit 18 (FIG. 1) through the port 1810 and the inverter 1917, and with the second bank access coincidence signal from the second bank checking unit 18 (FIG. 1) through the port 1820 and the inverter 1918 and outputs a first AND signal through a port 1919.

The second AND gate is connected to the first AND gate 1912 and the module checking circuit 16 (FIG. 1) through the ports 1919 and 161. The second AND gate is supplied with the first AND signal and the module coincidence signal from the first AND gate 1912 and the module checking circuit (FIG. 1) through the ports 1919 and 161 and outputs a second AND signal through a port 1920.

The module flag 1914 is connected to the second AND gate 1913 through the port 1920. An input port and an output port of the module flag 1914 are connected to each other through an inverter 1921. The module flag 1914 is supplied with the second AND signal from the second AND gate 1913 through the port 1920 and outputs a flag signal through a port 1922.

The judging circuit 1911 is connected to the first bank checking circuit 17, the second bank checking circuit 18 (FIG. 1), and the module flag 1914 through the ports 1710, 1720, 1810, 1820, and 1922. The judging circuit 1911 comprises a plurality of gate circuits (not shown). The judging circuit 1911 is supplied with the first bank access coincidence signal from the first bank checking unit 17 (FIG. 1) through the port 1710, with the second bank access coincidence signal from the first bank checking unit 17 (FIG. 1) through the port 1720, with the first bank access coincidence signal from the second bank checking unit 18 (FIG. 1) through the port 1810, with the second bank access coincidence signal from the second bank checking unit 18 (FIG. 1) through the port 1820, and with the flag signal from the module flag 1914 through the port 1922 and outputs a first inhibit signal and a second inhibit signal through two ports 1923 and 1924.

Turning back to FIG. 1, the shift signal supply circuit 193 is connected to the access judging circuit 191 through the ports 1923 and 1924 and to the first bank address signal holding circuit 14 and the second address bank signal holding circuit 15 through two ports 1931 and 1932. The shift signal supply circuit 193 comprises a plurality of gate circuits (not shown) and outputs the first shift signal and the second shift signal through the ports 1931 and 1932.

A truth table of the judging unit 19 is illustrated in FIGS. 7 and 8. In the truth table, symbols 0 and 1 represent binary zero and one values of the signals which are either supplied to or produced from the ports indicated along the top line of each of FIGS. 7 and 8. A symbol x is representative of a signal which is not used in judgement of a truth value. Another symbol (1) is representative of another signal generated when a failure occurs in the memory access control device 10 illustrated in FIG. 1.

As is apparent from the truth table (FIGS. 7 and 8), the access judging circuit 191 alternately produces the first inhibit signal and the second inhibit signal when supplied with the module coincidence signal, produces the first inhibit signal when supplied with the first bank coincidence signal, and produces the second inhibit signal when supplied with the second bank coincidence signal. The access judging circuit 191 outputs the first and the second inhibit signals through the ports 1923 and 1924. As is also apparent from the truth table, the shift signal supply circuit 193 produces the first shift signal when the access judging circuit 191 does not produce the first inhibit signal. The shift signal supply circuit 193 produces the second shift signal when the access judging circuit 191 does not produce the second inhibit signal.

Turning back to FIG. 1, the shift signal supply circuit 193 uses the first and the second shift signal in transferring the first bank address held signal to the first bank access signal holding circuit 171 (FIG. 4) as the first bank access held signal, and the second bank address held signal to the second bank access signal holding circuit 181 (FIG. 5) as the second bank access signal.

The address signal processing circuit 13 further comprises a first and a second input flag (not shown). The first input flag is connected to the first processor 121 and the access judging circuit 191 through a port 125 of the memory access control device 10 and through the port 1923. The second input flag is connected to the second processor 122 and the access judging circuit 191 through a like port 126 and the port 1924. When the first input flag is supplied with the first inhibit signal from the access judging circuit 191 through the port 1923, the first input flag produces a first input inhibit signal which inhibits supply of the first input address signal to the first register 131 and supplies the first input inhibit signal to the first processor 121. When the second input flag is supplied with the second inhibit signal from the access judging circuit 191 through the port 1924, the second input flag produces a second input inhibit signal which inhibits supply of the second input address signal to the second register 132 and supplies the second input inhibit signal to the second processor 122.

An access signal output control unit 20 is connected to the address signal processing unit 13 and the judging unit 19 through the two ports 137 and 138 of the address signal processing circuit 13 and through the ports 1923 and 1924. The access signal output control unit 20 comprises an access signal sending controller 201 and a specifying circuit 202.

The access signal sending controller 201 is connected to the address signal processing unit 13 and the judging unit 19 through the two ports 137 and 138 and through the ports 1923 and 1924. The access signal sending controller 201 comprises a plurality of gate circuits (not shown). The access signal sending controller 201 sends the first input address signal to the specifying circuit 202 when the access sending controller 201 is supplied with the first input address signal through the port 137 and when the access judging circuit 191 does not produce the first inhibit signal. The access signal sending controller 201 sends the second input address signal to the specifying circuit 202 when the access sending controller 201 is supplied with the second input address signal through the port 138 and when the access judging circuit 191 does not produce the second inhibit signal.

The specifying circuit 202 is connected to the access signal sending controller 201 through two ports 2011 and 2012 and to the plurality of memory modules 101 to 104 (FIG. 2) of the memory device 11 through four ports 2021 to 2024. The specifying circuit 202 comprises a plurality of gate circuits (not shown).

When the specifying circuit 202 is supplied with the first address signal from the access signal sending controller 201 through the port 2011, the specifying circuit 202 specifies, as a first specified memory module and a first specified memory bank, a particular memory module of the memory modules 101 and 104 (FIG. 2) and a particular memory bank of the memory banks 1001 to 1016, in the particular memory module. It is to be noted that the particular memory module and the particular memory bank are collectively indicated by the first address signal. The specifying circuit 202 sends the first element address portion of the first address signal to the first specified memory bank of the first specified memory module.

When the specifying circuit 202 is supplied with the second address signal from the access signal sending controller 201 through the port 2012, the specifying circuit 202 specifies, as a second specified memory module and a second specified memory bank, a specific memory module of the memory modules 101 to 104 (FIG. 2) and a specific memory bank of the predetermined number of memory banks 1001 to 1016 in the specific memory module. The specific memory module and the specific memory bank are collectively indicated by the second address signal. The specifying circuit 202 sends the second element address portion of the second address signal to the second specified memory bank of the second specified memory module.

The memory device 11 is connected to the first processor 121 through two ports 127 and 128 and connected to the second processor 122 through two different ports 120 and 129. The memory device 11 is supplied with a readout demand signal, a write demand signal, and the data from the first and the second processors 121 and 122. The first and the second processors 121 and 122 are supplied with data from the memory device 11.

What is claimed is:

1. A memory access control device which is for controlling access to a memory device including first through N-th memory modules, where N represents an integer greater than three, each of said memory modules comprising a predetermined number of memory banks, said memory access control device comprising:

address signal processing means supplied with first and second input address signals, said first input address signal including a first module address portion, a first bank address portion, and a first element address portion, said second input address signal including a second module address portion, a second bank address portion, and a second element address portion, said address signal processing means for processing said first and said second module address portions into first and second module address signals each of which represents one of addresses of said memory modules, said first and said second bank address portions into first and second bank address signals each of which represents one of addresses of said memory banks and for producing said first and second input address signals as first and second address signals as they are;

a first bank address signal holding circuit connected to said address signal processing means for holding said first bank address signal as a first bank address held signal;

a second bank address signal holding circuit connected to said address signal processing means for holding said second bank address signal as a second bank address held signal;

a module checking circuit connected to said address signal processing means for checking said first and said second module address signals to produce a module coincidence signal when said first and said second module address signals coincide;

a first bank access signal holding circuit connected to said first bank address signal holding circuit for holding a first bank access held signal;

a second bank access signal holding circuit connected to said second bank address signal holding circuit for holding a second bank access held signal;

a first bank access checking circuit connected to said address signal processing means and said first bank access signal holding circuit for checking said first bank address signal and said first bank access held signal to produce a first bank coincidence signal when said first bank address signal and said first bank access held signal coincide with each other;

a second bank access checking circuit connected to said address signal processing means and said second bank access signal holding circuit for checking said second bank address signal and said second bank access held signal to produce a second bank coincidence signal when said second bank address signal and said second bank access held signal coincide with each other;

access judging means connected to said module checking circuit and said first and said second bank access checking circuits for alternately producing a first inhibit signal and a second inhibit signal when supplied with said module coincidence signal, said access judging means producing said first inhibit signal when supplied with said first bank coincidence signal, said access judging means producing said second inhibit signal when supplied with said second bank coincidence signal, said access judging means producing first and second shift signals when said first and said second inhibit signals are not produced, respectively;

shift signal supply means connected to said access judging means and said first and said second bank address signal holding circuits for using said first and said second shift signals in transferring said first bank address held signal to said first bank access signal holding circuit as said first bank access held signal, and said second bank address held signal to said second bank access signal holding circuit as said second bank access held signal; and access signal output control means connected to said memory modules, said address signal processing means, and said access judging means for specifying by said first address signal, as a first specified memory module and a first specified memory bank, a particular memory module of said memory modules and a particular memory bank of said predetermined number of memory banks in said particular memory module to send said first element address portion to said first specified memory bank of said first specified memory module when said access signal output control means is supplied with said first address signal and when said access judging means does not produce said first inhibit signal, said access signal output control means specifying by said second address signal, as a second specified memory module and a second specified memory bank, a specific memory module of said memory modules and a specific memory bank of said predetermined number of memory banks in said specific memory module to send said second element address portion to said second specified memory bank of said second specified memory module when said access signal output control means is supplied with said second address signal and when said access judging means does not produce said second inhibit signal.

2. A memory access control device for controlling access to a memory device, said memory device including first through N-th memory modules, where N represents an integer greater than three, each of said memory modules comprising a predetermined number of memory banks, said memory access control device comprising:

address signal processing means supplied with a first input address signal comprising a first module address portion, a first bank address portion, and a first element address portion and a second input address signal comprising a second module address portion, a second bank address portion, and a second element address portion, for processing said first and said second module address portions into first and second module address signals each of which represents an address of said memory modules, said first and said second bank address portions into first and second bank address signals each of which represents one of addresses of said memory banks and for producing said first and said second input address signals as first and second address signals as they are;

a first bank address signal holding circuit connected to said address signal processing means for holding said first bank address signal as a first bank address held signal;

a second bank address signal holding circuit connected to said address signal processing means for holding said second bank address signal as a second bank address held signal;

a module checking circuit connected to said address signal processing means for checking said first and said second module address signals to produce a module coincidence signal when said first and said second module address signals coincide with each other;

a first bank access signal holding circuit connected to said first bank address signal holding circuit for holding a first bank access held signal;

a second bank access signal holding circuit connected to said second bank address signal holding circuit for holding a second bank address hold signal;

a first bank access checking circuit connected to said address signal processing means and said first bank access signal holding circuit for checking said first bank address signal and said first bank access held signal to produce a first bank coincidence signal when said first bank address signal and said first bank access held signal coincide with each other;

a second bank access checking circuit connected to said address signal processing means and said second bank access signal holding circuit for checking said second bank address signal and said second bank access held signal to produce a second bank coincidence signal when said second bank address signal and said second bank access held signal coincide with each other;

access judging means connected to said module checking circuit and said first and said second bank access checking circuits for alternately producing a first inhibit signal and a second inhibit signal when supplied with said module coincidence signal, said access judging means producing said first inhibit signal when supplied with said first bank coincidence signal, said access judging means producing said second inhibit signal when supplied with said second bank coincidence signal, said access judging means producing first and second shift signals when said first and said second inhibit signals are not produced, respectively;

shift signal supply means connected to said access judging means and said first and said second bank address signal holding circuits for supplying said first and said second shift signals to said first and said second bank address signal holding circuits to transfer said first bank address held signal to said first bank access signal holding circuit as said first bank access held signal, and said second bank address held signal to said second bank access signal holding circuit as said second bank access held signal; and access signal output control means connected to said memory modules, said address signal processing means, and said access judging means for specifying by said first address signal, as a first specified memory module, a particular memory module of said memory modules to send said first bank address portion and said element address portion to said first specified memory module when said access signal output control means is supplied with said first address signal and when said access judging means does not produce said first inhibit signal, said access signal output control means specifying by said second address signal, as a second specified memory module, a specific memory module of said memory modules to send said second bank address portion and said element address portion to said second specified memory module when said access signal output control means is supplied with said second address signal and when said access judging means does not produce said second inhibit signal.

3. A memory access control device for controlling access to a memory device comprising first through N-th memory modules, where N represents an integer greater than three, each of said memory modules comprising a predetermined number of memory banks, said memory access control device comprising:

address signal processing means, supplied with a first input address signal comprising a first module address portion, a first bank address portion, and a first element address portion and a second input address signal comprising a second module address portion, a second bank address portion, and a second element address portion, for processing said first and said second module address portions into first and second module address signals each of which represents an address of said memory modules and, for processing said first and said second bank address portions into first and second bank address signals, each of which represents an address of said memory banks and for producing said first and said second input address signals as first and second address signals as they are;

a first bank address signal holding circuit connected to said address signal processing means for holding said first bank address signal as a first bank address held signal;

a second bank address signal holding circuit connected to said address signal processing means for holding said second bank address signal as a second bank address held signal;

a module checking circuit connected to said address signal processing means for checking said first and said second module address signals to produce a module coincidence signal when said first and said second module address signals coincide with each other;

a first bank access signal holding circuit connected to said first bank address signal holding circuit for holding a first bank access held signal;

a second bank access signal holding circuit connected to said second bank address signal holding circuit for holding a second bank access held signal;

a first bank access checking circuit connected to said address signal processing means and said first bank access signal holding circuit for checking said first bank address signal and said first bank access held signal to produce a first bank coincidence signal when said first bank address signal and said first bank access held signal coincide with each other;

a second bank access checking circuit connected to said address signal processing means and said second bank access signal holding circuit for checking said second bank address signal and said second bank access held signal to produce a second bank coincidence signal when said second bank address signal and said second bank access held signal coincide with each other;

access judging means connected to said module checking circuit and said first and said second bank access checking circuits for alternately producing a first inhibit signal and a second inhibit signal when supplied with said module coincidence signal, said access judging means producing said first inhibit signal when supplied with said first bank coincidence signal, said access judging means producing said second inhibit signal when supplied with said second bank coincidence signal, said access judging means producing first and second shift signals when said first and said second inhibit signals are not produced, respectively;

shift signal supply means connected to said access judging means and said first and said second bank address signal holding circuits for supplying said first and said second shift signals to said first and said second bank address signal holding circuits to transfer said first bank address held signal to said first bank access signal holding circuit as said first bank access held signal, and said second bank address held signal to said second bank access signal holding circuit as said second bank access held signal; and access signal output control means connected to said memory modules, said address signal processing means, and said access judging means for inhibiting supply of said first and said second address signals to said memory modules when said access judging means produces said first inhibit signal and when said access judging means produces said second inhibit signal, respectively.

* * * * *